PROCESS FOR PREPARING MERCURY CADMIUM TELLURIDE

Filed Oct. 9, 1968

*INVENTORS*
PAUL W. KRUSE
JOSEPH L. SCHMIT
*BY* [signature]
ATTORNEY.

United States Patent Office 3,723,190

Patented Mar. 27, 1973

3,723,190

PROCESS FOR PREPARING MERCURY CADMIUM TELLURIDE

Paul W. Kruse, Edina, and Joseph L. Schmit, Hopkins, Minn., assignors to Honeywell Inc., Minneapolis, Minn.

Filed Oct. 9, 1968, Ser. No. 766,235
Int. Cl. H01l 3/20
U.S. Cl. 148—1.5 11 Claims

ABSTRACT OF THE DISCLOSURE

A process is described for preparing or treating mercury cadmium telluride ($Hg_{1-x}Cd_xTe$) wherein the material is subjected to two separate heat treatment steps. The treatment improves inferior or mediocre infrared radiation detector material in a controlled manner without adversely affecting originally good material thereby increasing process yield and reproducibility.

BACKGROUND OF THE INVENTION

The formula $Hg_{1-x}Cd_xTe$ represents a mixed crystal alloy system of HgTe and CdTe in which $x$ denotes the mole fraction of CdTe. The constituent compounds of the system have the same type of crystal structure and chemical formula and are mutually soluble in all compositions. Since CdTe is a semiconductor and HgTe is a semimetal, the alloy system ranges from semimetal to semiconductor, with an energy gap variation dependent upon $x$.

The various alloys of the system are difficult to synthesize in a controlled manner. For example, all the alloys of the system are decomposing solids. That is, heating the solid phase in an open vessel results in the loss of its components so that congruent melting is impossible. Thus these alloys must be prepared in sealed containers. However, the equilibrium pressure of mercury over $Hg_{1-x}Cd_xTe$ in the compositions of most general interest is roughly 50 to 100 atmospheres at the liquidus temperature. As a result, many of the attempts to prepare these alloys in sealed containers fail by explosion.

Furthermore, the liquidus and solidus temperatures of these alloys differ, causing segregation to occur as the alloy is frozen or solidified from the melt. The resultant point-to-point variation of $x$ in the solidified material results in a corresponding variation in energy gap and consequent variation in the electrical and optical properties throughout the material. In addition, these alloys are defect solids in which deviations from stoichiometry, which may occur from point-to-point in the material, act as electrically active donors and acceptors.

On the other hand, some of these same characteristics which give rise to the various problems indicated above make these alloys a desirable single crystal material for use in intrinsic infrared detectors provided the problems can be overcome. An intrinsic infrared detector is basically a simple device. Incident infrared radiation excites electrons from states near the top of the valence band of the intrinsic semiconductor material across its energy gap into states near the bottom of the conduction band, producing excess electron-hole pairs which change the electrical properties of the material. The form in which this change appears depends on the properties and configuration of the material. For example, in a photoconductive sample the change is detected as an increase in electrical conductivity whereas, in a sample incorporating a pn junction or a sample designed as a photoelectromagnetic (PEM) sensor, it is detected as a photovoltage. $Hg_{1-x}Cd_xTe$ material provides detectors in all three forms.

The fact that $Hg_{1-x}Cd_xTe$ is an alloy semiconductor, the energy gap of which can be varied, permits the gap to be optimized for the detection of a variety of wavelengths. More specifically, the alloy system $Hg_{1-x}Cd_xTe$ consists of a mixture of the wide gap semiconductor Cdle ($E_g$=1.6 ev.) with the compound, HgTe, which is actually a semimetal that can be thought of as a semiconductor having a "negative energy gap" of about 0.3 ev. The negative gap in HgTe is generically related to the 1.6 ev. gap in CdTe; the gap width varies linearly with $x$ between two endpoint values, so that it passes through zero at an intermediate composition ($x \cong 0.15$) and is 0.1 ev., for example, at $x \cong 0.2$. It is clear then that materials suitable for intrinsic infrared detectors can be obtained by alloying HgTe and CdTe together to obtain HgTe-rich alloys in the range of about $$0.15 \lesssim x \lesssim 1.0$$

This invention is particularly concerned with $$Hg_{1-x}Cd_xTe$$

in which the $x$ value is such as to provide an infrared detecting material which is particularly sensitive in the 8 to 14 micron infrared wavelength range. However, the invention is applicable to material having all possible $x$ values.

As previously indicated, it is particularly desirable to obtain substantially single crystal and intrinsic $Hg_{1-x}Cd_xTe$ material from which to fabricate intrinsic infrared detectors. However, because of the problems mentioned above, it is almost impossible to prepare true intrinsic material. When prepared by standard high purity techniques, such as the zone refining of some of the starting materials and using special cleanliness precautions during processing, crystals of this material can be grown which are relatively free of foreign atom impurities but which are non-stoichiometric. Non-stoichiometry in these alloys gives rise to electrical carriers the same as impurities do. Because relatively large portions of the crystals prepared by techniques heretofore known in the art have been non-stoichiometric, much of the material has been wasted. In other words, the techniques and processes heretofore used have resulted in low material yields insofar as the usefulness of the material in infrared detectors is concerned.

A description of a typical prior art method for preparing this material is found in U.S. Pat. 2,053,690 which issued to W. D. Lawson et al. in 1960. Additional information of interest may be found in "Preparation and Physical Properties of Crystals in the HgTe-CdTe Solid Solution Series," by Blair and Newnham which appeared in the Conference on the Metallurgy of Elemental and Compound Semiconductors, volume 12, Inter-Science Publishers, 1960; in "Solid Solution in $A^{II}B^{VI}$ Tellurides" by Woolley and Ray, which appeared in J. Phys. Chem. Solids, volume 13, pages 151–153, 1960 and in the Doctors Thesis of Huguette Rodot presented to the faculty of the University of Paris in January 1964, Ser. No. 1096, Order 1119.

SUMMARY OF THE INVENTION

This invention is based on the conclusion that slightly n-type single crystal material is a particularly desirable material for infrared detector use and that such material can be provided with a precise control over stoichiometry and conductivity type as will be described hereinbelow. The fact that this material is a defect solid permits the extrinsic carrier concentration to be adjusted in accordance with this invention by heat treatment in a controlled atmosphere, following preparation of the alloy, whereby the mercury content is adjusted thereby controlling carrier concentration.

According to one embodiment of this invention, the material is deliberately prepared by including an excess amount of mercury in the initial steps of preparation to insure the synthesis of an n-type material. During solidification from the melt, advantage is taken of the natural tendency for mercury to precipitate throughout the bulk of the solidified material in globules, such that the residual free electron concentration is about $2 \times 10^{15}$ cm.$^{-3}$. The mercury content of the material is subsequently adjusted by a two-step heat treatment which provides a substantially single crystal, more homogeneous and stoichiometric, slightly n-type material, for example, $2 \times 10^{14}$ electrons cm.$^{-3}$. By definition herein, slightly n-type refers to free electron concentrations ranging from intrinsic to about $1 \times 10^{15}$ cm.$^{-3}$. The material is also provided more reproducibly and with greater yields per ingot than heretofore possible.

In its most preferred form this invention then provides a process for preparing low carrier concentration, slightly n-type $Hg_{1-x}Cd_xTe$ material with improved yields wherein the material is prepared with an amount of mercury in excess of the stoichiometric amount required so that it is n-type; subjected to a first heat treatment to improve the overall microscopic homogeneity of the material, and finally subjected to a second lower temperature heat treatment under mercury vapor to further adjust carrier concentration to a point where the material becomes slightly n-type.

However, from a general standpoint the invention may be used to treat any $Hg_{1-x}Cd_xTe$ material by means of a two-step heat treatment whereby its electrical properties are improved.

DESCRIPTION OF THE PREFERRED EMBODIMENTS

Figures 1, 2:
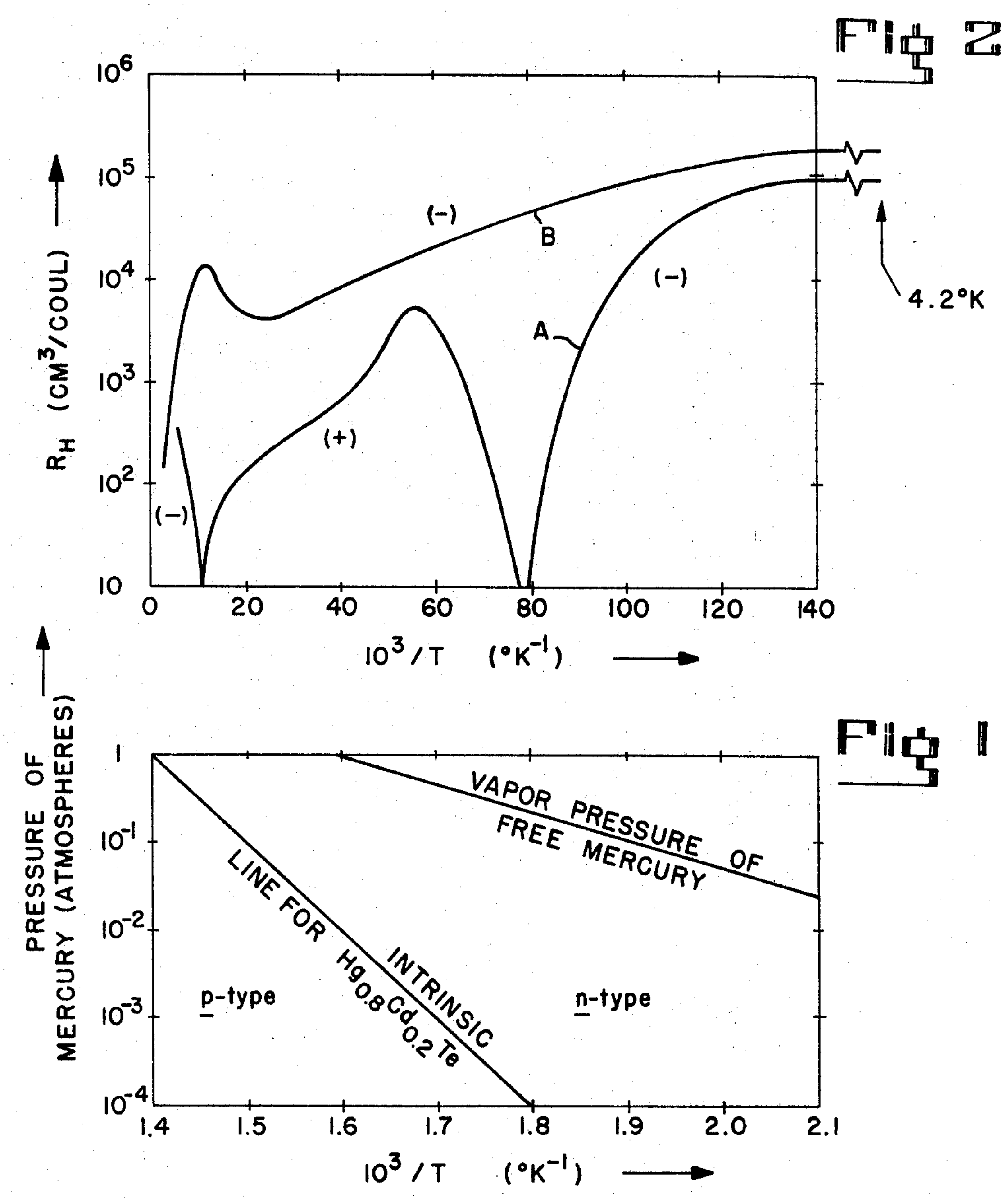
FIG. 1 illustrates the conditions of $Hg_{0.8}Cd_{0.2}Te$ sample temperature and mercury vapor pressure employed to adjust the stoichiometry and thereby prepare high purity n-type material.
FIG. 2 is a graph showing the temperature dependence of the Hall coefficient of a $Hg_{1-x}Cd_xTe$ ($x \cong 0.2$) sample before and after heat treatment in accordance with this invention.

Generally, the material is prepared by mixing the three constituent elements together in a closed container, such as a sealed quartz ampoule, and heating at a temperature high enough to cause formation of the compounds HgTe and CdTe which are dissolved in each other. During heating the ampoule is gently rocked to mix the alloy. After a suitable period the melt is allowed to solidify by cooling in the ampoule. At this point the resultant ingot will be substantially single crystal by virtue of crystalline growth while solidifying, but it will have a definite dendrite substructure if solidification has been relatively rapid.

The primary objects of the above steps are the combination of the three elemental constituents and the solidification of the melt with a minimum amount of macroscopic segregation. The solidified material may have relatively large microscopic gradients (on a sub-millimeter scale) but only relatively small macroscopic gradients (on a centimeter scale).

After solidification the ingot is subjected to a relatively high temperature heat treatment which homogenizes the crystal from a microscopic standpoint, substantially removes any dendrites and generally makes it more uniform. The diffusion coefficient of the material is sufficient to homogenize the material by this first heat treatment step according to this invention insofar as the microscopic gradients are concerned.

Finally, the ingot or pieces thereof (usually transverse slices of the ingot) are subjected to the second and final heat treatment step in mercury vapor to controllably adjust the stoichiometry of the material to a predetermined value.

A preferred process for preparing an alloy of $Hg_{1-x}Cd_xTe$ according to this invention is more specifically described as follows.

COMBINING THE STARTING MATERIALS AND FORMING THE INGOT

The material is prepared using the best commercially available constituent elements. The mercury typically contains less than about 8 parts per billion impurities, which are mainly copper, silver and gold. A vial of mercury is usually opened under vacuum and only used for one ingot of the material to prevent the possibility of contamination.

The cadmium used contains a total of about 200 parts per billion magnesium and silver. This is high but the cadmium is diluted in a finished ingot so that the impurity level is tolerable.

The tellurium used contains about 7 parts per million impurities, mainly oxygen and selenium. It is usually zone-refined for about 500 to 1000 passes before being used in order to reduce the impurity content.

An additional amount of mercury over and above that normally calculated as required for stoichiometry is used when combining the mercury, cadmium and tellurium constituents in order to prevent the formation of tellurium rich compounds which are the principal cause of p-type non-stoichiometry in this material. The purpose and function of the excess mercury is to provide a mercury vapor pressure within the container of a high enough value to prevent the depletion of mercury from the melt in quantities large enough to make the material highly non-stoichiometric.

If excess mercury is not added, the resultant material is usually p-type with a high carrier concentration and is essentially useless as an intrinsic photoconductive infrared detector material. When excess mercury is added, the resultant material is n-type with a relatively low carrier concentration. This is because excess mercury precipitates during solidification from the melt, in the form of globules, causing the free electron concentration in the material to be approximately $2 \times 10^{15}$ cm.$^{-3}$. For example, in preparing 200-gram ingots, 2 grams of additional mercury have been found sufficient to make an ingot n-type when the volume of the container was about 48 cm.$^3$.

More generally, many ingots of $Hg_{1-x}Cd_xTe$ have been prepared with an excess of mercury of about 0.050 gm./cm.$^3$ of total container volume. All such ingots contained mercury droplets in the finished crystal, indicating that excess mercury had precipitated during processing. The ingots were n-type and were found to respond readily to the heat treatment procedures in accordance with this invention. On the other hand, ingots prepared with only 0.032 and 0.036 gm./cm.$^3$ of mercury were p-type. They responded less readily to heat treatment in accordance with this invention.

After the constituents in their selected proportions are placed in a container, it is then evacuated and sealed. To insure adequate mixing of the constituents during their initial reaction in forming the alloy, the container can be rocked, for example, through an angle of $\pm 20$ degrees, during heating. Other techniques which insure thorough mixing may be employed. An electrical furnace with independently controlled heating zones has been used for these purposes. The furnace was adapted to rock the melt container during heating to provide mixing. The temperatures maintained are in the 675 to 1075° C. range. Temperature is not critical as long as it is above the liquidus temperature of the particular alloy being prepared and the internal pressure does not exceed the failure pressure of the container. The container may be maintained at any particular selected temperature in excess of the liquidus temperature for various periods. Sixteen hours at 820° C. has been found to be satisfactory for the $x=0.2$ alloy, although it is not critical.

Solidification of the material from the melt has been controlled manually by periodically adjusting the voltages in the zoned electrical rocking-furnace in order to cool the melt sequentially. This sequential cooling and solidification of the melt fosters substantial single crystal formation in the resultant ingot. An automatic programmed furnace system has also been used successfully and is especially preferred since it provides the most reproducible results. Through the use of an automatic, programmed cool-down system the rocking furnace reaction has standardized the $x$ profile of the ingots of material to a high degree.

A preferred furnace arrangement for heating the melt and solidification has been found to be one wherein the furnace contains three individually controlled zones, a separate zone for each end of the melt and an intermediate zone. During rocking, all the zones are preferably programmed to maintain a temperature about 25° C. above the liquidus temperature, i.e., about 820° C. for material having an $x$ value≅0.2. A preferred solidification procedure is as follows: Initially the zone at one end of the melt is turned off to establish a temperature gradient along the melt. Subsequently, the temperature in the middle zone is decreased for a time and then is turned off. Finally the other end zone is turned off. The exact times used in any particular instance will depend on the particular furnace arrangement and amount of material being prepared. It is preferred that the ingot be solidified rapidly enough to minimize long range segregation. This process causes the formation of the dendritic substructure within the otherwise substantially single crystal ingot. For most 200-gram samples a total solidification time of about two hours is preferred. Faster cooling usually results in substantial polycrystalline formation while very slow cooling and solidification allows more macroscopic segregation to occur. The actual conditions for solidification under all particular circumstances cannot be defined specifically. But one of ordinary skill in the art will be able to adapt these teachings to fit his particular needs and obtain the benefits of this invention.

Although nothing has been found to be as satisfactory as the programmed cool-down procedure, other solidification techniques, which are adapted to minimize segregation during solidification, may also be used. The preferred programmed technique does not require remelting of the solidified material whereas most other techniques do. For example, a technique first used by Satterthwaite and Ure, reported in "Physial Review," 108, 1164 (1957), to minimize the segregation of impurities in $Bi_2Te_3$ has been used with some degree of success to prepare single crystals of $Hg_{1-x}Cd_xTe$. With this technique, an ampoule having a conical tip at the lower end to promote crystal growth is comprised of two cylindrical zones of differing diameters arranged in tandem, the diameter of the upper section being substantially larger than that of the lower The ampoule of molten material is slowly lowered through a low temperature zone so that crystallization proceeds from the lower end toward the upper. After the solidification reaches the interface between the lower and upper sections, the power to the heating furnace is turned off. Since the volume of the lower section is much less than that of the upper section, in principle, the melt is only slightly depleted in the segregating constituent.

Another technique which has been used is that of vertical zone melting, also known as sealed-solid zone melting. This technique was first applied to CdTe by Lorenz and Halsted and is reported in the "Journal of the Electrochemical Society," 110, 343 (1963). The technique is useful for decomposing solids having vapor pressures high enough to preclude normal zone melting. By orienting the ampoule vertically, the molten zone is confined by the ampoule walls thus preventing the decomposition of the material.

Other modifications of the Bridgman technique have also been used.

FIRST HEAT TREATMENT

Ingot formation is followed by a heat treatment at a relatively high first temperature for a time of sufficient duration to remove the microscopic compositional gradients or dendrites which form during solidification of the ingot. The heat treatment may be performed on the ingot without removing it from its container.

This first heat treatment occurs at a temperature below the solidus temperature of the material for a time of sufficient duration to allow material diffusion throughout the ingot. That is to say, variations in $x$ value over distances about 1 mm. or less are substantially reduced or eliminated by this heat treatment. For example, in $$Hg_{1-x}Cd_xTe$$

having $x=0.2$, 43 hours at 600° C. or 5–10 days at 650° C.–690° C. have been found to be satisfactory for numerous 200-gram ingot samples.

In general, other times and temperatures are acceptable so long as the temperature is high enough and is maintained for a time of sufficient duration to substantially remove dendritic substructure without actually melting the ingot. Typically, five days at 650° C. for $x=0.2$ material is a preferred set of conditions for achieving substantial homogeniety throughout 200-gram ingots.

SECOND HEAT TREATMENT

The first heat treatment is followed by a second one whereby the carrier concentration of the material is further adjusted by performing the heat treatment under mercury vapor to provide a desirable material which is slightly n-type. The second heat treatment may be performed on the entire ingot or pieces of it. This heat treatment step adjusts the stoichiometry of the material by reducing the free electron concentration in n-type material due to excess mercury or by converting p-type material to n-type by adding mercury.

Since $Hg_{1-x}Cd_xTe$ is a defect solid, deviations from stoichiometry due to an excess or lack of mercury provide donor and acceptor centers, respectively. Interstitial mercury atoms appear to act as donors and mercury vacancies as acceptors. The extrinsic semiconducting properties of a crystal, measured for example by thermoprobing or by the Hall effect, can be converted from n-type to p-type and back again by adjusting the mercury vapor pressure during this heat treatment step. In general then, this heat treatment step provides a way of adjusting the stoichiometry and thereby the electrical properties of the material to improve them toward the requirements of infrared radiation detectors.

For this second heat treatment step, the material is again sealed into a container, such as a quartz ampoule or other suitable closed container, containing liquid mercury. The container should be so designed that the material and the mercury can be heated separately and maintained at different temperatures. The liquid mercury should not be allowed to touch the material although mercury vapor should be able to move freely about the container. A container with a side arm for the liquid mercury is suitable for this purpose. The container is placed in a furnace where the material temperature and the mercury temperature, which is the lowest temperature within the capsule, are controlled independently. After a suitable time in the furnace, the container is removed and cooled. The exact method of cooling is unimportant. Since excess mercury is always added, the temperature of the mercury is normally specified rather than the mercury vapor pressure. Hall and thermoprobe data may be taken after this step to evaluate the material and classify it according to conductivity type and carrier concentration. Table I summarizes examples of various heat treatment conditions for 33 groups, each group representing several samples of material. For groups VIII through XV, both n- and p-type samples were subjected to heat treatment. Electrical types were determined before and after heat treatment by thermoprobing at 77° K.

To provide $Hg_{1-x}Cd_xTe$ material for which $x=0.2$ and which is slightly n-type, the second heat treatment step should be accomplished with the mercury source temperature above that given by the following equation.

$$T_s > T_{Hg} > 1000T_s/(3250-2.965\ T_s)$$

Where:

$T_{Hg}$ is the mercury source temperature in ° K.
$T_s$ is the sample temperature in ° K.

For example, with a sample at 441° C. (714° K.) the mercury temperature must be greater than 350° C. (1 atm.) while for a sample at 393° C. the mercury temperature must be greater than 250° C. (0.1 atm.).

The time required for the second heat treatment step to substantially reach an equilibrium condition with regard to carrier concentration depends primarily on sample size, thickness and the like. Generally, a few days are required. Large masses of crystal or entire ingots require long heating times to establish equilibrium, sometimes as long as two months.

For samples having dimensions of about 1 mm. x 1.5 mm. x 1.9 mm. an equilibrium condition was reached in less than four days with the samples at 400° C. in a mercury vapor atmosphere of about 1.63 atm. Equilibrium was indicated by no significant carrier concentration change with longer heating.

TABLE I.—EXAMPLES OF SECOND HEAT TREATMENT CONDITIONS

| Sample group | Sample group heat treatment temp. (° C.) | Hg temp. (° C.) | Heat treatment time (days) | Sample type at 77° K.: Before heat treatment | Sample type at 77° K.: After heat treatment |
|---|---|---|---|---|---|
| I | 300 | 295 | 1/6 | n | n |
| II | 300 | 295 | 1 | n | n |
| III | 300 | 295 | 4 | n | n |
| IV | 300 | 295 | 7 | n | n |
| V | 400 | 395 | 1/6 | n | n |
| VI | 400 | 395 | 1 | n | n |
| VII | 400 | 395 | 4 | n | n |
| VIII | 299 | 294 | 10 | p & n | n |
| IX | 299 | 295 | 10 | p & n | n |
| X | 300 | 297 | 10 | p & n | n |
| XI | 301 | 295 | 10 | p & n | n |
| XII | 297 | 295 | 10 | p & n | n |
| XIII | 298 | 296 | 10 | p & n | n |
| XIV | 295 | 291 | 10 | p & n | n |
| XV | 301 | 293 | 56 | p & n | n |
| XVI | 300 | 295 | 10 | p | n |
| XVII | 300 | 295 | 10 | p | n |
| XVIII | 300 | 295 | 10 | p | n |
| XIX | 300 | 295 | 10 | p | n |
| XX | 300 | 295 | 10 | p | n |
| XXI | 300 | 295 | 10 | p | n |
| XXII | 300 | 295 | 10 | p | n |
| XXIII | 300 | 295 | 10 | p | n |
| XXIV | 330 | 322 | 10 | p | n |
| XXV | 330 | 292 | 10 | p | n |
| XXVI | 330 | 277 | 10 | p | n |
| XXVII | 300 | 297 | 12 | p | n |
| XXVIII | 300 | 271 | 12 | p | n |
| XXIX | 300 | 271 | 12 | p | n |
| XXX | 273 | 269 | 10 | p | n |
| XXXI | 273 | 245 | 10 | p | n |
| XXXII | 273 | 215 | 10 | p | n |
| XXXIII | 298 | 268 | 63 | p | n |

Referring to FIG. 1, the intrinsic line is shown for $Hg_{0.8}Cd_{0.2}Te$. It was determined as follows. A number of samples were cut from a crystal ingot, each sample containing both n- and p-type regions. The samples were each heated in different mercury vapor pressures for one day. Following the treatment, the conductivity type at the sample surface was measured by thermoprobing at 77° K. Table II lists the data showing both p to n and n to p transitions while FIG. 1 shows the best intrinsic line taken from the data of Table II.

It is believed that to obtain the maximum D*, the $Hg_{1-x}Cd_xTe$ alloy used should have the highest possible Hall coefficient consistent with the forbidden energy gap and be n-type at 77° K. so the near-intrinsic case holds for the noise; see the paper in Infrared Physics, 7, 169 (1967) by D. Long. Studies indicate that the 77° K. Hall coefficient in as-grown material is increased by this heat treatment in mercury vapor. The results shown in FIG. 1 and Table II indicate that the resultant material is n-type at 77° K. after treatment over a relatively large range of mercury vapor pressures. Typical temperatures used are 300° C. or 400° C. although they are not critical and lower or higher temperatures may also be used as given by the foregoing equation in the case of material where $x \cong 0.2$.

The objective of the second heat treatment step then is to adjust the stoichiometry of $Hg_{1-x}Cd_xTe$ material and its carrier concentration by heating it in a controlled atmosphere of mercury vapor. The material can be made to change type by this procedure. FIG. 2 is a plot of $R_H v.10^3/T$ for a Hall sample before and after heat treatment. The "double cross-over" Hall curve A is from an as-grown alloy sample, while Hall curve B is the same alloy sample after heat treatment for three days at 400° C. and a mercury vapor pressure of about 1.6 atmospheres. The irregularities in the curves are believed to be due to material inhomogeneities.

As indicated in FIG. 1 and Table II, temperatures and pressures over a rather wide range may be utilized in the second step of the heat treatment. However, temperatures from about 300° C. to about 400° C. appear to be most practical for $x=0.2$ material.

MATERIAL EVALUATION TECHNIQUES

Two methods for $x$ determination in $Hg_{1-x}Cd_x\,Te$ are in common use and have been used to evaluate material prepared in accordance with this invention. The first involves measurement of the density of samples using a standard lost-weight method. Since the density change with x is relatively small in $Hg_{-x}Cd_xTe$, one must use a high-density, low-volatility fluid and a microbalance, making the usual corrections for air buoyance. The precision of the method permits the density to be measured to 0.001 gm./cm.³ for a 0.1 gm. sample, corresponding to an error in $x$ of less than 0.001 mole fraction. The density varies linearly with $x$, but the absolute value of $x$ for a given density has an uncertainty of about 0.01 mole fraction due to uncertainties in the original standards. Thus the density method yields $x$ values with an absolute accuracy of ±0.01 mole fraction and a precision or repeatability of 0.001 mole fraction.

The second method used to determine alloy composition is the electron-beam microprobe. In this method a beam of electrons is focused on a spot of material, which then emits X-rays. X-rays characteristic of each element are detected and counted, yielding a measure of the composition. Since the reabsorption of emitted X-rays depends

*Detectivity, as defined in Elements of Infrared Technology, Kruse, McGlauchlin and McQuistan, Wiley, New York, 1962, p. 271 for infrared detectors.

TABLE II.—INTRINSIC LINE HEAT TREATMENT CONDITIONS

| Individual samples | Sample type at 77° K. before second heat treatment | Second heat treatment sample temperature, Hg pressure, time | Sample type at 77° K. after second heat treatment | Type determined by— |
|---|---|---|---|---|
| 1 | p | 400° C., 1.6 atm. 10.6 days | n | Hall voltage. |
| 2 | p | 394° C., 1.6 atm., 3 days | n | Do. |
| 3 | Mixed p and n | 315° C., $2.5\times10^{-1}$ atm., 1 day | n | Thermoprobing. |
| 4 | do | 314° C., $1.2\times10^{-1}$ atm., 1 day | n | Do. |
| 5 | do | 316° C., $4.8\times10^{-2}$ atm., 1 day | n | Do. |
| 6 | do | 317° C., $217\times10^{-2}$ atm., 1 day | Surface area of n region increased | Do. |
| 7 | do | 314° C., $3.6\times10^{-3}$ atm., 1 day | do | Do. |
| 8 | do | 312° C., $2.4\times10^{-4}$ atm., 1 day | No increase in n or p regions | Do. |
| 9 | do | 9399° C., $8.5\times10^{-1}$ atm., 1 day | Surface area of n region increased | Do. |
| 10 | do | 394° C., $2.5\times10^{-1}$ atm., 1 day | do | Do. |

on the composition, and day-to-day changes in the characteristics of the beam and detector can occur, one normally used a secondary standard having a composition near the expected value as reference. The absolute accuracy can be no greater than that of the standard used, which is about 0.01 mole fraction, and the precision when using a 30 micron diameter, 0.1 microamp beam counted for 1 minute is limited by statistical fluctuations in the count to about ±0.006 mole fraction near $x=0.2$. This method is used primarily on very small samples or to detect microscopic composition gradients. When using a 5-micron diameter, 0.01-microamp beam for detailed work, however, the statistical fluctuations limit the precision to approximately ±0.01 mole fraction near $x=0.2$.

Since $Hg_{1-x}Cd_xTe$ is a defect solid wherein deviations from stoichiometry can act as donors and acceptors, the normal way of measuring stoichiometry is by means of the Hall effect which gives the number of uncompensated acceptors or donors. See for example a paper by Olaf Lindberg in Proc. of the IRE, p. 1414 (1952).

A second method is thermoprobing, described briefly by Madelung in "Physics of III–V Compounds," Wiley, New York, 1964, p. 192. In this technique, a temperature gradient is established across a sample, and as a result a thermoelectric voltage is generated. The sign of this voltage with respect to the temperature gradient, indicates whether the sample is n- or p-type.

Having described the invention it will be readily apparent to those familiar with this art that many modifications of the process are possible. It should therefore be understood that the invention is not to be limited by the embodiments described but only by the scope of the following claims.

The embodiments of the invention in which an exclusive property or right is claimed are defined as follows:

1. A process for controlling the stoichiometry, conductivity type and free carrier concentration of a $Hg_{1-x}Cd_xTe$ alloy, comprising the steps of:
providing a body of the alloy;
heating the alloy in an evacuated container and maintaining it at a first temperature near but below the solidus temperature of the alloy for a time of sufficient duration to insure a substantially homogeneous composition due to material diffusion throughout the alloy, and
heating the alloy in the presence of mercury vapor and maintaining it at a second temperature for a time of sufficient duration to adjust stoichiometry, conductivity type and free carrier concentration.

2. The process of claim 1 wherein the alloy is initially p-type and is changed to n-type by the heat treatment in mercury vapor.

3. The process of claim 1 wherein the alloy is initially n-type and the free carrier concentration is reduced by the subsequent heat treatment in mercury vapor.

4. The process of claim 1 wherein the $x$-value is about 0.2 and the first temperature is about 600–650° C. and is maintained for about 43 hours.

5. The process of claim 1 wherein the $x$-value is about 0.2 and the last step is carried out in a container having a mercury vapor source which is heated separately from the alloy body and the heating temperatures of the alloy body ($T_s$) and the mercury vapor source ($T_{Hg}$) are further characterized in that they are selected according to the following conditions:

$$T_s > T_{Hg} > 1000T_s/(3250-2.965T_s)$$

Where:
$T_s$ is the alloy body temperature in ° K., and
$T_{Hg}$ is the mercury vapor source temperature in ° K.

6. The process of claim 1 wherein the alloy provided is prepared by the following steps of:

enclosing the individual elemental constituents in an evacuated container, the constituents being selected in such relative amounts as to provide an alloy of a predetermined $x$-value except for the mercury which is included in an amount in excess of that necessary for stoichiometry;
heating the constituents and mixing them together to form a melt, and
cooling the melt to form a solid body of the alloy.

7. The process of claim 6 wherein the $x$-value is about 0.2 and the excess mercury is provided in an amount of about 0.05 gm./cm.$^3$ of container volume.

8. The process of claim 6 wherein the $x$-value is about 0.2 and the first temperature is about 600–650° C. and is maintained for about 43 hours.

9. The process of claim 6 wherein the $x$-value is about 0.2 and the last step is carried out in a container having a mercury vapor source which is heated separately from the alloy body and the heating temperatures of the alloy body ($T_s$) and the mercury vapor source ($T_{Hg}$) are further characterized in that they are selected according to the following conditions:

$$T_s > T_{Hg} > 1000T_s/(3250-2.965T_s)$$

Where:
$T_s$ is the alloy body temperature in ° K., and
$T_{Hg}$ is the mercury vapor source temperature in ° K.

10. The process of claim 9 wherein the alloy is maintained at a second temperature of about 300–400° C. and the mercury source is maintained at a temperature of about 290–390° C. for up to about 10 days.

11. The process of claim 6 wherein:
the relative amounts of the constituents are selected to provide an alloy wherein the $x$-value is about 0.2;
additional mercury in the amount of about 0.050 gm./cm.$^3$ of total container volume is added;
the constituents are heated at a temperature of about 820° C. for about 16 hours to form a melt;
the container is rocked during heating to insure mixing of the constituents;
the alloy is solidified by cooling the melt sequentially along its length, the cooling being initiated by exposing one end of the melt to a cooling temperature, then after a time exposing a middle portion of the melt to a cooling temperature and finally after an additional time exposing the other end of the melt to a cooling temperature;
the first heating temperature is about 650° C. and is maintained for about 5 days, and
the last step is carried out in a container having a mercury vapor source which is heated separately from the alloy, the heating temperature of the alloy is about 300° C., the heating temperature of the mercury source is about 290° C., and the heating is maintained for about 10 days.

References Cited

UNITED STATES PATENTS

| | | | |
|---|---|---|---|
| 3,152,373 | 10/1964 | Einthoven | 148—178 |
| 3,245,846 | 4/1966 | Dehmelt | 148—178 |
| 3,245,848 | 4/1966 | De Vaux | 148—189 |
| 3,477,887 | 11/1969 | Ehlenberger | 148—189 |
| 3,514,347 | 5/1970 | Rodot et al. | 148—1.5 |
| 3,622,399 | 11/1971 | Johnson | 252—62.3 ZT |

CARL D. QUARFORTH, Primary Examiner

B. HUNT, Assistant Examiner

U.S. Cl. X.R.

148—1.6; 75—169; 252—62.3 ZT